United States Patent [19]

Ruck

[11] Patent Number: 5,570,629
[45] Date of Patent: Nov. 5, 1996

[54] JUICE EXTRACTION DEVICE

[75] Inventor: Robin W. Ruck, Southbury, Conn.

[73] Assignee: Dynamics Corporation of America, New Hartford, Conn.

[21] Appl. No.: 518,269

[22] Filed: Aug. 23, 1995

[51] Int. Cl.⁶ .............................. A23N 1/00; A47J 19/02; A47J 43/00
[52] U.S. Cl. .................................. 99/506; 99/501; 99/505; D7/665
[58] Field of Search ..................... 99/501–508; D7/665

[56] References Cited

U.S. PATENT DOCUMENTS

| | | | |
|---|---|---|---|
| 303,812 | 8/1884 | Cornford | 99/505 |
| 325,099 | 8/1885 | Manny | 99/503 |
| 343,754 | 6/1886 | Bradley | 99/505 |
| 377,140 | 1/1888 | Bristow | 99/508 |
| 569,747 | 10/1896 | Curley | 99/506 |
| 644,736 | 3/1900 | Easley | 99/508 |
| 992,667 | 5/1911 | Kandlbinder | 99/508 |
| 1,674,475 | 6/1928 | Loomis | 99/508 |
| 2,217,559 | 10/1940 | Melzl | 99/502 |
| 2,257,430 | 9/1941 | Savitz et al. | 99/508 |
| 2,410,562 | 11/1946 | Barany | 99/505 |
| 2,500,986 | 3/1950 | Green | 99/502 |

Primary Examiner—Timothy F. Simone
Attorney, Agent, or Firm—McCormick, Paulding & Huber

[57] ABSTRACT

A juice extracting device for rupturing the exposed cellular structure of a section of fruit such as oranges, grapefruit, lemons, et al. comprising an upstanding reamer with a bulbous head. The bulbous head portion takes a generally spherical configuration and with the spherical surface extending downwardly and inwardly beyond an imaginary diametrical horizontal plane. Thus, a downwardly diminishing horizontal cross section is provided beneath the plane with speed and efficiency of juice extraction greatly enhanced.

17 Claims, 2 Drawing Sheets

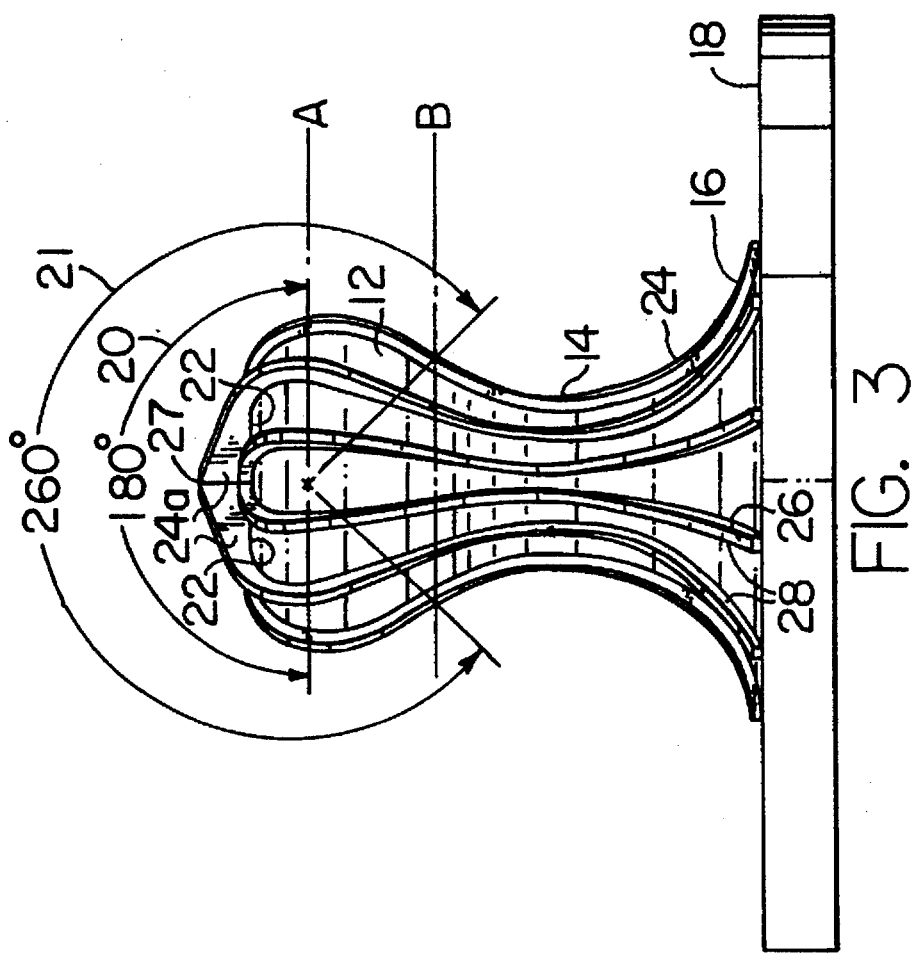

5,570,629

JUICE EXTRACTION DEVICE

BACKGROUND OF THE INVENTION

This invention relates to devices for rupturing the exposed cellular structure of a section of fruit from an orange, grapefruit, lemon et al. on relative rotation between the device and the section of fruit in pressure engagement therewith. Such devices are disclosed in the following U.S. Patents:

| U.S. Pat. No. | Issue Date |
| --- | --- |
| D172,508 | June 29, 1954 |
| 27,948 | December 7, 1897 |
| 1,674,475 | June 19, 1928 |
| 1,941,164 | December 26, 1933 |
| 2,454,085 | November 16, 1948 |

As will be apparent, each of the devices disclosed includes an upstanding "reamer" which takes a somewhat arcuate cone shape and upon which a section of fruit is disposed in a face down or inverted attitude. On relative rotation of the fruit and the reamer under pressure, the exposed cellular structure of the fruit is ruptured with the result that juice is extracted therefrom.

Devices of the type disclosed have been used for many years with generally satisfactory results. The devices have not been wholly satisfactory, however, with regard particularly to the speed and efficiency of juice extraction.

It is the general object of the present invention to provide an improved "reamer" upon which a section of fruit may be disposed for relative rotation under pressure with the extraction of juice occurring in a minimum period of time and with the highest degree of efficiency in juice extraction.

SUMMARY OF THE INVENTION

In fulfilling the foregoing object a juice extraction device is provided with an upstanding reamer which is substantially uniform about a vertical axis over and in pressure engagement with which a section of fruit in an inverted attitude may be placed for relative rotation. The reamer has a parti-spherical bulbous configuration at an upper and free end portion which is exposed upwardly with the generally spherical surface extending downwardly and inwardly substantially beyond an imaginary diametrical and horizontal plane. A horizontal cross section of downwardly diminishing diameter is thus provided beneath the imaginary plane. The reamer also has a series of circumaxially spaced cutting elements which engage and tend to rupture the exposed cellular structure and thereby extract juice from a section of fruit placed thereover in pressure engagement and in relative rotation with respect thereto.

In operation, and particularly when a section of fruit is tilted back and forth in a somewhat oscillatory motion about the bulbous head of the reamer, juice extraction is achieved in a much shorter period of time and in a much more efficient manner than heretofore possible with conventional juice extraction devices.

DESCRIPTION OF THE DRAWINGS

FIG. 3 is a side view of the improved juice reamer of the present invention.

DESCRIPTION OF THE PREFERRED EMBODIMENT

Figure 1:
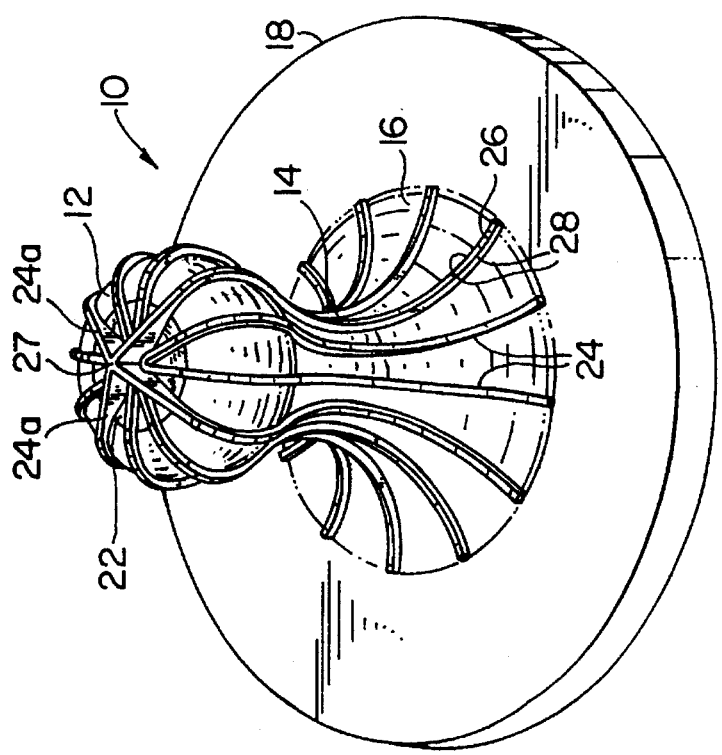
FIG. 1 is a perspective view of an improved juice reamer of the present invention.

Referring now particularly to FIG. 1, an improved reamer constructed in accordance with the present invention has a bulbous head or head portion 12 and a reduced diameter stem portion 14. A base portion 16 is enlarged relative to the stem portion 14 and may be somewhat the same in diameter as the head portion 12. A further enlarged base portion 18 may be placed within a saucer-like container or the like in a manually operable extraction device or may be connected with a rotary driving element in a power driven extraction device. Preferably, the unit is of molded plastic construction with all parts thereof integrally formed.

Referring now particularly to FIG. 3, it will be observed that the bulbous head or head portion 12 of the reamer extends downwardly and inwardly beyond an imaginary diametrical horizontal plane A which may be said to bound or to be bounded by a 180° arc 20. Thus, beneath the plane A the horizontal cross section of the reamer diminishes sharply in diameter with a region of reverse curvature first occurring approximately at a second imaginary horizontal plane B. The horizontal plane B may be said to bound or to be bounded by an arc 21 of approximately 260°. The arc may fall between 220° and 300° with the 260° arc shown being presently preferred. The stem portion 14 of the reamer continues to be reduced in cross section in progression downwardly beyond the plane B and then reverses to an increased diametrical cross section in further downward progress to the base 16.

Figure 2:
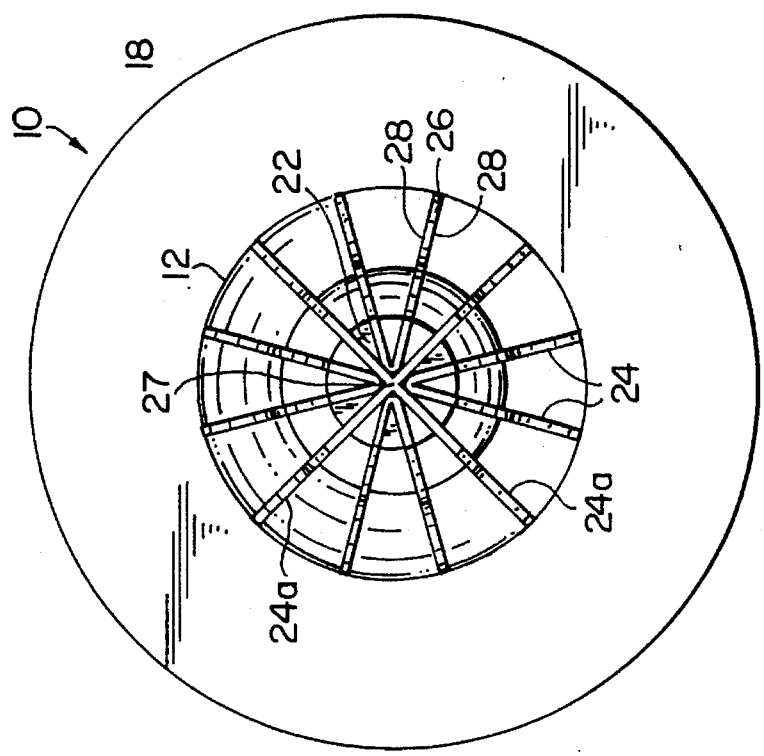
FIG. 2 is a top view of the improved juice reamer of the present invention.

At the top of the head or head portion an uppermost and central substantially flat apex portion of the reamer is preferably provided as illustrated by circle 22 in FIGS. 1 and 2 and also at 22 in FIG. 3. Cutting elements in the form of ribs 24,24 meet or join at the apex portion 22 centrally as best illustrated in FIGS. 1 and 2. Various numbers of cutting elements may be provided such as six (6) elements, eight (8) elements with twelve (12) elements presently preferred and shown. The cutting elements are arranged circumaxially, preferably in equal circumaxial spacing as illustrated, and extend downwardly about the bulbous head portion 12, through and beyond the stem portion 14 and to the base portion 16 terminating a juncture with the enlarged base portion 18. The cutting elements or ribs 24,24 are preferably formed integrally as mentioned above and each element is shown with a substantially flat face 26 which serves to define relatively sharp edges 28,28 at opposite sides thereof where the face portion joins with opposed sides of the cutting elements or ribs.

At their apex where the ribs join centrally on the flat uppermost section 22, two or more of the ribs may be formed to define a shallow upwardly exposed pointed configuration for efficient cutting of the cellular structure of the fruit. As shown, four (4) ribs 24a,24a are oppositely joined in pairs to provide for the upwardly exposed shallow pointed configuration. That is, the ribs 24a,24a extend upwardly substantially beyond the remaining ribs 24,24 to form the pointed section 27 at the apex of the reamer.

As will be apparent, a relatively simple and yet highly efficient reamer has been provided. With a section of fruit pressed downwardly and tilted about the head 12 during rotation, and due to the bulbous construction thereof with the spherical surface extending downwardly and inwardly substantially beyond the imaginary plane A, pressure engagement of the fruit with a much larger generally spherical surface is achieved. That is, with the traditional generally coned shaped reamers there is a loss of engagement between the reamer and the fruit as a piece of fruit is tilted about the head of the reamer. Substantial enhancement of such engagement occurs with the present improved reamer with resulting of high speed and highly efficient juice extraction.

Geometrical and spacial terminology used herein such as "upstanding", "vertical", "downwardly etc." is used for convenience of description only and is not to be taken as limiting in any manner whatsoever in the specification or claims which follow.

We claim:

1. A juice extraction device for rupturing the exposed cellular structure of a section of fruit such as an orange, grapefruit, or lemon on relative rotation between the device and the section of fruit in pressure engagement therewith; the device comprising an upstanding reamer substantially uniform about a vertical axis over and in pressure engagement with which a section of fruit may be placed face down for rotation relative thereto, the reamer having a generally partially-spherical and bulbous configuration at an upper and free end portion which is exposed upwardly with the generally spherical surface extending downwardly and inwardly substantially beyond an imaginary diametrical and horizontal plane, a horizontal cross section of downwardly diminishing diameter thus being provided beneath the plane, and said reamer also having a series of circumaxially spaced cutting elements which engage and tend to rupture the exposed cellular structure and thereby extract juice from a section of fruit placed thereover in pressure engagement and in relative rotation with respect thereto.

2. A juice extraction device as set forth in claim 1 wherein a region of reverse curvature is provided substantially beneath the imaginary horizontal plane.

3. A juice extraction device as set forth in claim 2 wherein said region of reverse curvature occurs approximately at a second imaginary horizontal plane bounding an arc between 220° and 300°.

4. A juice extraction device as set forth in claim 2 wherein said region of reverse curvature occurs approximately at an imaginary horizontal plane bounding an arc of approximately 260°.

5. A juice extraction device as set forth in claim 1 wherein said cutting elements take the form of ribs which project from the reamer and which extend from an uppermost and central substantially flat apex location thereon downwardly about the partially-spherical top portion of the reamer.

6. A juice extraction device as set forth in claim 5 wherein said ribs extend downwardly to and beyond a second imaginary horizontal plane bounding an arc of approximately 260°.

7. A juice extraction device as set forth in claim 1 wherein said cutting elements extend downwardly to and beyond a second imaginary horizontal plane bounding an arc of approximately 260°.

8. A juice extraction device as set forth in claim 2 wherein said cutting elements extend downwardly to and beyond a second imaginary horizontal plane which is disposed substantially downwardly from said first plane.

9. A juice extraction device as set forth in claim 4 wherein said ribs extend downwardly to and beyond a second imaginary horizontal plane bounding an arc of approximately 260°.

10. A juice extraction device as set forth in claim 1 wherein said cutting elements take the form of ribs which meet at an uppermost and central substantially flat apex location and which extend downwardly therefrom substantially throughout the length of the reamer.

11. A juice extraction device as set forth in claim 1 wherein at least six (6) such cutting elements are provided.

12. A juice extraction device as set forth in claim 1 wherein at least eight (8) cutting elements are provided.

13. A juice extraction device as set forth in claim 1 wherein at least twelve (12) cutting elements are provided.

14. A juice extraction device as set forth in claim 1 wherein said cutting elements are substantially equally circumaxially spaced about said parti-spherical upper free end portion of the reamer.

15. A juice extraction device as set forth in claim 1 wherein said cutting elements take the form of ribs meeting at uppermost and central substantially flat apex position with certain ribs varying substantially in height.

16. A juice extraction device as set forth in claim 15 wherein said cutting elements take the form of said certain ribs meeting at the apex to form a shallow upwardly exposed pointed configuration.

17. A juice extraction device as set forth in claim 1 wherein said cutting elements have relatively flat outer surfaces forming a pair of opposed cutting edges with their adjacent side surfaces.

* * * * *